Sept. 29, 1970  F. LISSAU  3,531,132
PRESSURE ENERGIZED SEAL
Filed July 22, 1968  2 Sheets-Sheet 1

INVENTOR
FREDERIC LISSAU
BY
AGENT

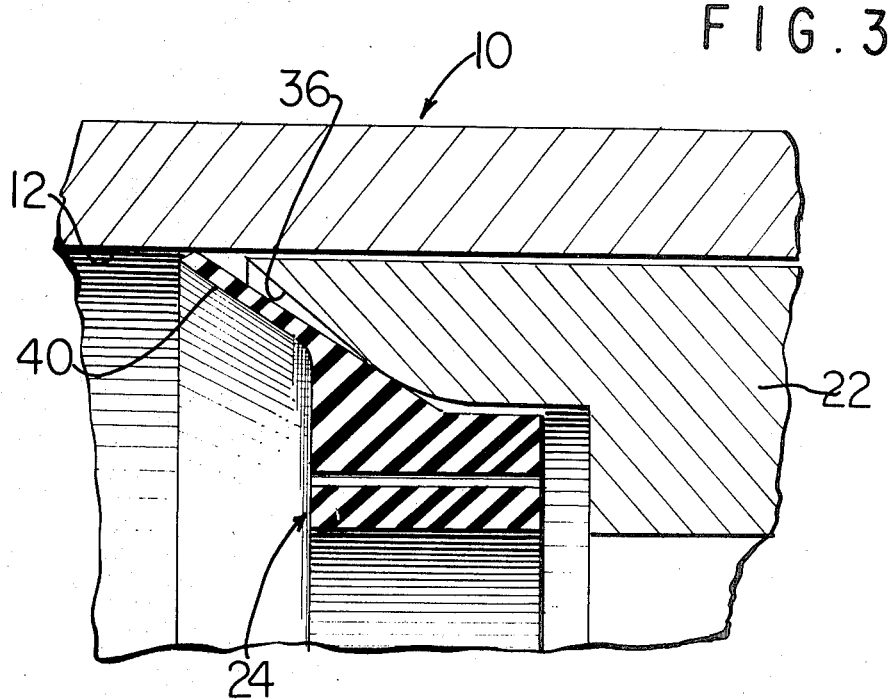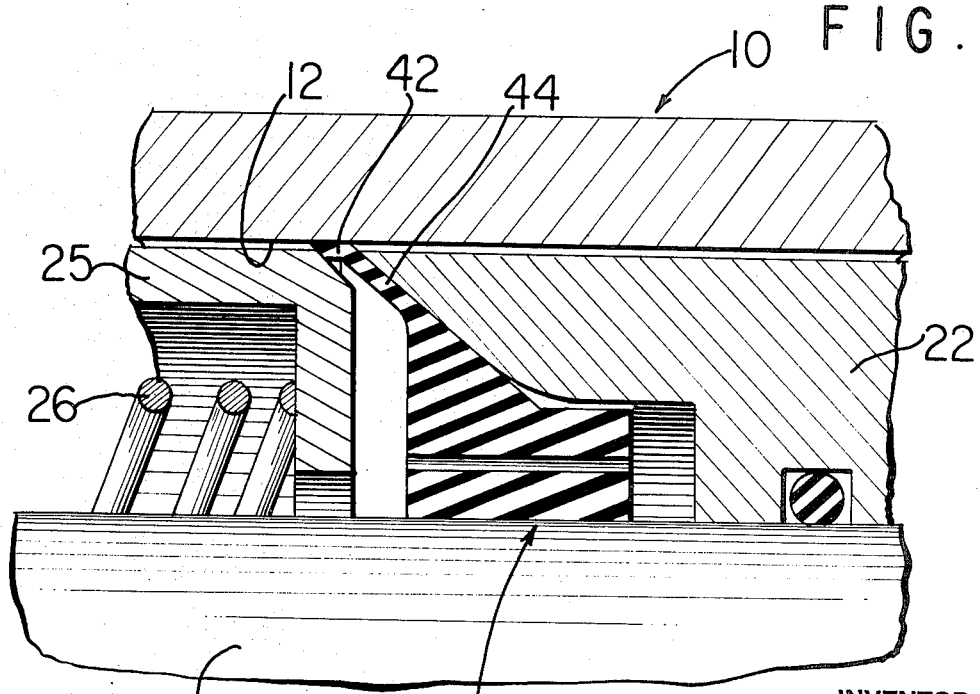

United States Patent Office 3,531,132
Patented Sept. 29, 1970

3,531,132
PRESSURE ENERGIZED SEAL
Frederic Lissau, Rego Park, Queens, N.Y., assignor to Walter Kidde & Company, Inc., Belleville, N.J., a corporation of Delaware
Filed July 22, 1968, Ser. No. 746,337
Int. Cl. F16j *15/00;* F16r *31/50;* F01b *31/00*
U.S. Cl. 277—115                                  3 Claims

ABSTRACT OF THE DISCLOSURE

An assembly for providing a pressure energized seal between a piston and a cooperating cylinder bore including a sleeve on the piston having a sloping seal shaping surface and an annular plastic seal provided with a thick base portion and a thin conical skirt portion of greater diametrical extent than the cylinder bore and capable of being permanently deformed by fluid pressure to conform to the shape of the surface of the sleeve and to seal against the cylinder bore and against the sleeve surface.

BACKGROUND OF THE INVENTION

Field of the invention

The present invention relates to pressure energized seal assemblies and more particularly to low friction seal assemblies for use between relatively reciprocating concentric members.

Description of the prior art

In the past, a number of different types of seals have been developed to prevent fluid from flowing between relatively reciprocating concentric members. These seals are mounted either as piston seals on the inner member or as shaft seals on the outer member.

In order to simplify the explanation of the construction and operation of the prior art, only piston seal configurations will be discussed. It will be appreciated however that seals of the same type in shaft seal configurations function in the same manner and have the same disadvantages.

The most common of the prior art seals use plastic sealing members of the O ring, chevron, and cup types. These sealing members all have a bulky cross-section with a large surface area exposed to the pressurized fluid medium within the space between the piston and the bore and a large surface area in contact with the cylinder bore especially when acted upon by pressure. Since the sealing members are made of plastic material they behave as a fluid when under pressure and the pressure is transmitted through the plastic material to force the sealing member into contact with cylinder bore.

The plastic sealing members of these prior art seals are made of substantial thickness in order to provide an effective seal using convenient tolerances in the dimensions and surface finish of the sealing member. When such large sealing areas are used, a certain degree of irregularity in the matting surface can be tolerated since there will be sufficient points of contact along the thickness of the seal to provide effective sealing.

The frictional force developed by the seal, which resists relative movement between the piston and the bore, is proportional to the total force pressing the sealing member against the bore. In pressure energized seals, this force is equal to the fluid pressure multiplied by the contact area and where the contact area is large, as in the prior art seals, the frictional force is high.

In the past, the approach used to reduce the friction developed by the seal has been to simply decrease the thickness of the sealing member, at least at the outer edge where it contacts the surface of the bore. The narrow outer edge of the seal was made to be parallel with the bore surface and to have a longitudinal extent substantially equal to the seal thickness. The friction is thereby decreased in direct proportion to the decrease in thickness of the seal.

As the thickness of the sealing member decreases, the probability of having sufficient contact points to form an effective seal also decreases. Therefore, with this approach, as the sealing member is made thinner, the contacting surface of the sealing member must be made smoother and to a closer tolerance in order to insure an effective seal. However, as the thickness of the sealing member is decreased, the pliability of the plastic makes it increasingly difficult to machine smooth and true surfaces particularly on the outer edges thereof. Thus, the extent to which friction can be reduced by this approach is limited because of the difficulty experienced in forming the sealing members accurately enough to provide an effective seal.

SUMMARY

It is an object of the present invention to provide a low friction pressure energized seal assembly in which a very thin sealing member made to reasonable tolerances provides an effective seal.

Another object of the present invention is to provide such a seal assembly wherein the sealing member is pressure molded into its sealing configuration after the installation of the seal.

The foregoing objects are accomplished by providing a pressure seal assembly for sealing between first and second relatively reciprocating concentric members extending from a zone under fluid pressure and having an annular space therebetween in communicatiton with the pressurized zone, the seal assembly including a seal shaping formation carried by the first member and extending into the space, the formation having a surface facing the zone and sloping at an angle toward the space and the zone, and an annular deformable plastic sealing member having a base portion adjacent the first member and a thin skirt portion extending from the base portion to the second member, the skirt initially extending at an angle away from the surface and being of a thickness and material so as to be permanently deformed by fluid pressure to conform to the shape of the surface and being of sufficient length that after deformation by fluid pressure the skirt extends along the surface and past the surface to the second member and along the second member to provide a pressure seal both against the second member and against the surface.

BRIEF DESCRIPTION OF THE DRAWING

A preferred embodiment of the invention has been chosen for purposes of illustration and description and is shown in the accompanying drawings wherein:

FIG. 3 is a view similar to FIG. 2 illustrating the relative configurations after partial assembly.

FIG. 4 is a view similar to FIG. 3 illustrating the condition of the assembled seal after initial pressurization.

DESCRIPTION OF THE PREFERRED EMBODIMENT

Figure 1:
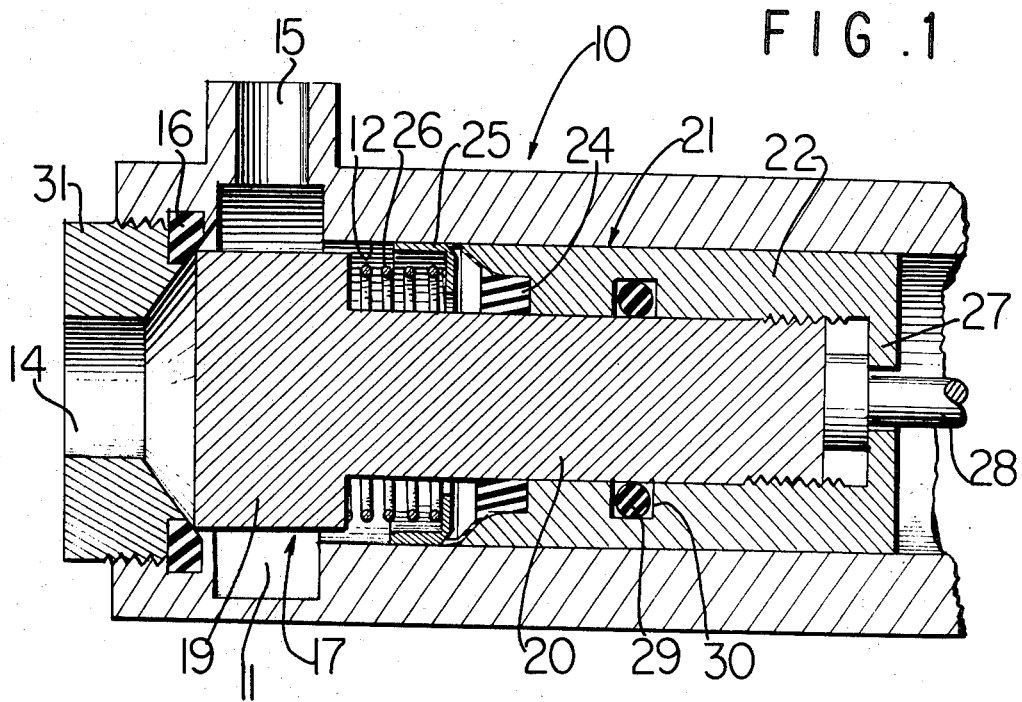
FIG. 1 is a longitudinal sectional view of a valve incorporating a seal according to the present invention.

In FIG. 1 of the drawings there is shown a valve comprising a body 10 providing a chamber 11 and a cylinder bore 12, an inlet 14 and an outlet 15 for the chamber 11, a valve seat 16 between the inlet and the outlet, a valve member 17 having a head portion 19 for cooperating with the seat 16 and a cylindrical portion 20 extending through the bore 12 toward a valve operating mechanism not shown, and a seal assembly 21 mounted on the cylindrical portion 20 for providing a low friction piston seal between the portion 20 and the cylinder bore 12.

The seal assembly 21 includes an annular seal housing 22 secured to the valve member portion 20, an annular plastic sealing member 24 seated against the housing, a cup shaped annular wedging element 25 engaging the sealing member, and a spring 26 biasing the wedging element against the sealing member. The seal housing 22 is internally threaded adjacent one end and is provided with an annular inwardly extending flange 27 at that end. The end of the valve member portion 20 is threaded into the housing 22 to clamp a valve actuating rod 28 extending from the operating mechanism (not shown). The housing 22 is pressure sealed to the valve member by means of an O ring 29 positioned in an annular groove 30 in the housing. The valve is assembled in the following sequence from the inlet end: the seal housing 22 and the sealing member 24 are slid into the bore; the actuating rod 28 is inserted; the valve member 17, with the spring 26 and wedging element 25 positioned thereon, is threaded into the seal housing 22; the valve seat 16 is inserted; and the insert 31 is threaded into the body 10.

Figure 2:
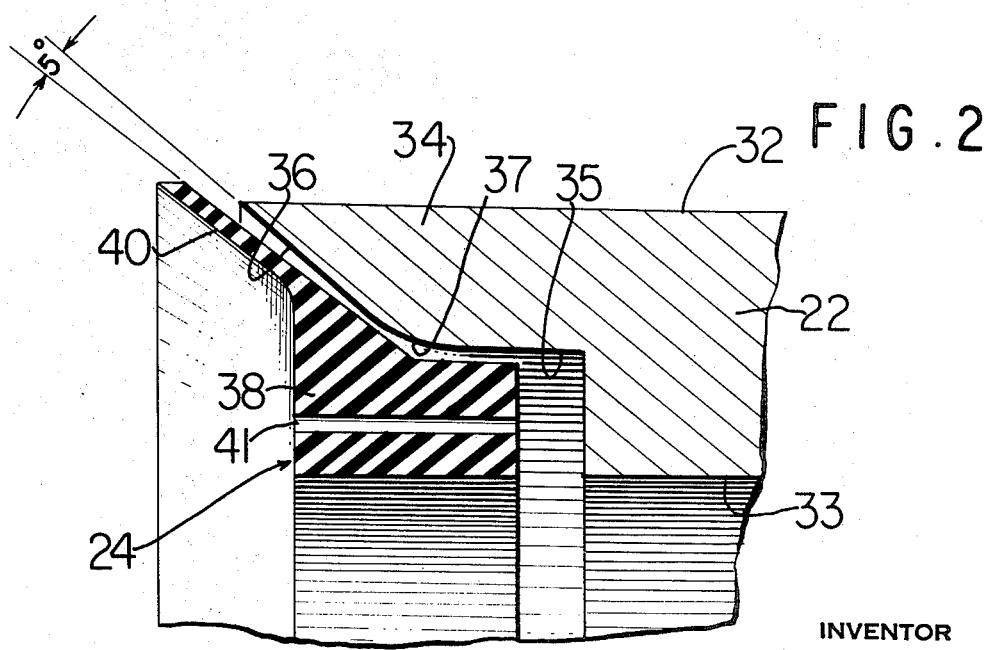
FIG. 2 is a partial sectional view of two of the seal assembly components illustrating their relative configurations before an assembly.

As shown in FIG. 2, the annular seal housing 22 has an outer annular surface 32 and is provided with a bore 33 and a seal receiving end 34 facing the pressure zone. The end 34 is provided with a short bore section 35 of larger diameter than said bore 32 and with a conical surface 36 extending outwardly and toward the pressure zone from adjacent the bore section 35 to the outer surface 31. A curved surface section 37 joins the conical surface and the surface of the bore section 35.

The sealing member 24 includes an annular thick base section 38 provided with a cylindrical portion 39 dimensioned to fit within the bore section 35 and a very thin conical seal forming skirt 40 extending outwardly toward the pressure zone. The diametrical extent of the skirt 40 is significantly greater than that of the bore 12 and the skirt is formed with an included angle which is less than the included angle of the conical surface 36 on the housing end 34. A plurality of passageways 41 extend through the base section 38 of the member 24 to prevent pressurized fluid medium from becoming trapped behind the member and displacing it when pressure is relieved. The The seal member 24 is preferably of Teflon but may be made of other plastic material such as nylon. The incorporation of the thick base section 38 provides structural support which enables the member 24 to be machined with greater ease.

FIG. 3 shows the condition of the seal assembly following the first step in assembling the valve when the seal housing 22 and the sealing member 24 are positioned within the bore 12 of the housing 10. The greater diametrical extent of the flange 40 causes the flange to be deflected away from the surface 36 when the housing 22 and the sealing member 24 are positioned within the bore.

After the valve is completely assembled, it is pressurized (at room temperature) and the fluid pressure permanently deforms the very thin skirt 40 pressing it against the surface 36 and the bore 12. Thus, the skirt 40 assumes the shape shown in FIG. 4 with an end portion 42 extending along the bore 12 and the remaining portion 44 extending along the surface 36. The skirt 40, because of its extreme thinness, is molded by the pressure into intimate contact with the bore 12 and the surface 36 thus eliminating the effect of minor surface irregularities and dimensioned error in the skirt 40. An extremely effective seal is thus formed between the skirt portion 42 and the bore 12 and between the portion skirt 44 and the surface 36.

The frictional force developed by the seal assembly is directly proportional to the contact surface area of the skirt portion 42 multiplied by the pressure of the fluid flowing through the valve. Although the length of the portion 42 is approximately twice the thickness of the skirt 40, the surface area of the portion 42 is only a fraction of the smallest surface contact area which could be reasonably provided in an effective seal of the prior art types.

The cup-shaped wedging element 25 is provided to insure a sealing contact between the skirt portion 24 and the bore 12 at extremely low temperatures. At such temperatures, the member 24 shrinks diametrically pulling the portion 42 away from the bore 12. The spring 26 exerts a small force, but one which is sufficient to lift the portion 42 into contact with the bore 12 when such shrinkage takes place.

As a specific example, a seal assembly built to the specifications listed below and installed in a valve having a bore 12 of 0.375 inch diameter was found to have zero leakage and exhibited (at room temperature) frictional forces of: 0.5 pound under no pressure; 1.0 pound under 500 p.s.i.; 1.5 pounds under 1000 p.s.i.; 2.0 pounds under 2000 p.s.i.; and 2.25 pounds under 3000 p.s.i.

Sealing member 24

| | |
|---|---|
| Material | Teflon. |
| Thickness of conical skirt | .005 inch. |
| Included angle of conical skirt 40 (as shown in FIG. 2) | 70 degrees. |
| Outer diameter of skirt 40 (as shown in FIG. 2) | 0.383 inch. |
| Length (approximate) of portion 42 of skirt (FIG. 4) | .012 inch. |

Seal housing

| | |
|---|---|
| Outer diameter | .374 inch. |
| Included angle of conical surface 36 | 80 degrees. |

In this specific example seal assembly, the spring 26 exerts a force of 1.0 pound against the wedging element 25.

From the foregoing, it will be seen that the present invention provides a low friction pressure energized seal assembly in which a very thin sealing member provides an effective seal by being pressure molded into its sealing configuration after installation of the seal.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A pressure seal assembly for sealing between first and second relatively reciprocating concentric members extending from a zone under fluid pressure and having an annular space therebetween in communication with the pressurized zone, said seal assembly including a seal shaping formation carried by said first member and extending into said space, said formation having a surface facing said zone and sloping at an angle toward said space and said zone, and an annular deformable plastic sealing member having a base portion adjacent said first member and a thin skirt portion extending from said base portion to said second member, means engaging on an end portion of said skirt portion to provide sealing contact with said second member and said surface, said skirt initially extending at an angle away from said surface and being of a thickness and material so as to be permanently deformed by fluid pressure to conform to the shape of said surface and being of sufficient length that after deformation by fluid pressure said skirt extends along said surface and past said surface to said second member and along said second member to provide a pressure seal both against said second member and against said surface.

2. A seal assembly according to claim 1 wherein said skirt extends along said second member a distance equal to about twice the thickness of said skirt.

3. A seal assembly according to claim 1 wherein said surface of said seal shaping formation is conical having an internal angle of about eighty degrees and said skirt is conical and has an internal angle before deformation by pressure no greater than about seventy degrees.

References Cited

UNITED STATES PATENTS

| | | | |
|---|---|---|---|
| 1,750,638 | 3/1930 | Jackson | 92—194 |
| 2,819,917 | 1/1958 | Watson et al. | 277—117 |
| 2,843,434 | 7/1958 | Orloff et al. | 277—117 X |
| 3,448,665 | 6/1969 | Allinquant | 277—188 |
| 3,467,357 | 9/1969 | Schomer et al. | 251—214 |

SAMUEL B. ROTHBERG, Primary Examiner

U.S. Cl. X.R.

277—117; 92—194